United States Patent [19]
Cox

[11] 3,953,074
[45] Apr. 27, 1976

[54] AUTOMATIC AND SUBSTANTIALLY PERMANENT WHEEL BALANCING DEVICE

[75] Inventor: Woodrow Wilson Cox, Andrews, N.C.

[73] Assignee: Herman E. Cox, Greenville, S.C.

[22] Filed: Aug. 4, 1975

[21] Appl. No.: 601,664

[52] U.S. Cl. ............................ 301/5 BA; 74/573 R
[51] Int. Cl.² ........................................... B60B 1/00
[58] Field of Search .................... 301/1, 5 B, 5 BA; 74/573

[56] References Cited
UNITED STATES PATENTS

| | | | |
|---|---|---|---|
| 3,410,154 | 11/1968 | Deakin | 301/5 BA |
| 3,799,619 | 3/1974 | La Barber | 301/5 BA |

*Primary Examiner*—Stanley H. Tollberg
*Assistant Examiner*—D. W. Keen
*Attorney, Agent, or Firm*—B. P. Fishburne, Jr.

[57] ABSTRACT

A device installable on all sizes of vehicle wheels, such as automotive and aircraft, to automatically and substantially permanently compensate for wheel imbalance due to uneven tire wear, unbalanced tire construction, and other known factors which effect wheel balance. Centrifugal force activated, freely circulating weight components within the annular tube body of the device tend to remain at the balanced wheel positions when the wheel is at rest. The device is applicable to single or dual wheels and other rotating bodies subject to dynamic imbalance.

8 Claims, 5 Drawing Figures

AUTOMATIC AND SUBSTANTIALLY PERMANENT WHEEL BALANCING DEVICE

BACKGROUND OF THE INVENTION

The desirability of an automatic centrifugal force responsive balancing means for the wheels of automotive vehicles, aircraft and the like has been recognized for many years, and quite a large number of United States patents and foreign patents have been granted on devices for this purpose. Three examples of the patented prior art relating to automatic vehicle wheel balancing are U.S. Pat. Nos. 3,006,690; 3,063,754 and 3,314,726.

In spite of the recognition of the problem over a considerable period of time and numerous efforts to provide a means offering a satisfactory solution to the problem, up to the present time, no automatic wheel balancing device has been widely accepted by the public or by industry for balancing vehicular wheels by centrifugal force activated means permanently attached to the wheel structure. The apparent reasons for this lack of acceptance are the undue cost and complexities of prior art devices, their lack of efficiency and reliability of operation, and their inability to "hold" or maintain substantially permanently a balanced wheel condition achieved during high speed rotation of the wheel. The present invention in particular has for one of its main objectives the provision of a permanently installed wheel balancer which will automatically balance the wheel under influence of centrifugal force during rotation, and will hold or maintain the balanced wheel condition almost perfectly when the wheel returns to rest following high speed rotation. If any small amount of imbalance develops in the wheel at rest, this condition will quickly disappear automatically during the next rotational acceleration of the wheel.

Another object of the invention is to provide an automatic and relatively permanent wheel balancing device which is applicable to all sizes of automobile, bus, truck and aircraft wheels, whether of the single or dual types. The essence of the invention resides in the utilization of an annular circular cross section tube body mountable in a fixed position on the wheel rim, preferably at the interior side of the wheel. Within the bore of the annular tube body are placed a plurality of even length uniform diameter preferably plastic tube segments which fill up a major portion of the interior volume of the annular tube body and are free to circulate circumferentially through the bore of the tube body during rotation of the wheel. A dry type lubricant is preferably included in the bore of the annular tube body to reduce to a minimum friction between the relatively movable parts of the device. The remaining interior volume of the annular tube body is filled with lead or steel balls of the proper uniform size and density, the particular material for the balls depending upon whether automotive or aircraft type wheels are involved. The balls are free to circulate within and through the bores of the segmental non-metallic tubing sections and through the main bore of the annular tube body which is preferably formed of a heat treated aluminum alloy.

The precise dimensional relationships between the circulating balls, precut non-metallic tube sections, and the main annular tube body will vary in accordance with wheel size. However, the total weight of the required lead or steel balls and the length of the plastic (preferably nylon) tubing required for each wheel size is directly mathematically proportional to wheel size up and down the scale of sizes, within three main categories of annular aluminum tube body size or outside diameter, namely, ⅜ inch o.d., ½ inch o.d., and ¾ inch o.d. In any case, the sizes and relative weights of components may be calculated empirically for the various applications of the invention, and the details of these calculations, as well as dimensional variations of the parts over the entire range of wheel sizes, are not essential to a full understanding of the invention, and therefore are not included herein. In this connection, the dimensional and mass characteristics of the operational components of the device while important are not so critical that slight variations in the sizes and numbers of the internal moving parts cannot be tolerated in a practical manufactured embodiment of the invention. That is to say, the device will still be entirely satisfactory in operation when such manufacturing variations are involved.

Other features and advantages of the invention will become apparent during the course of the following detailed description.

BRIEF DESCRIPTION OF DRAWING FIGURES

DETAILED DESCRIPTION

Figure 1:
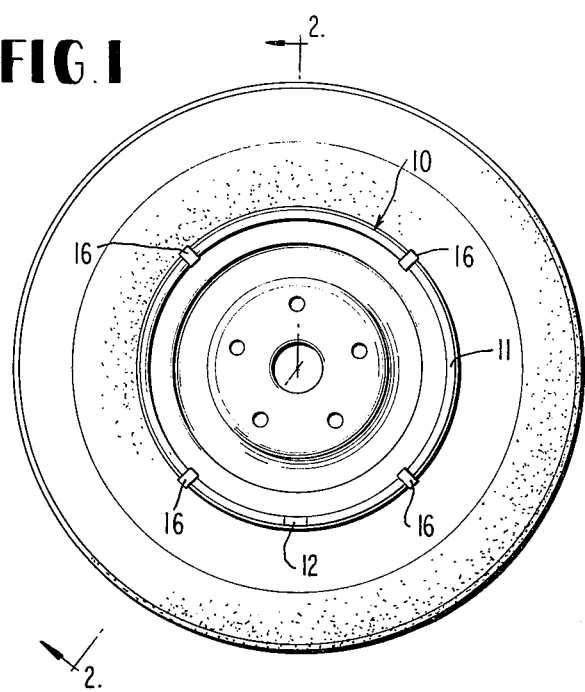
FIG. 1 is an interior side elevational view of a vehicle wheel having the invention installed thereon.

Referring to the drawings in detail wherein like numerals designate like parts throughout the same, and referring first to FIGS. 1 through 4, a wheel balancing device according to the invention is designated in its entirety by the numeral 10 and comprises an annular circular cross section tube body 11 preferably constructed from a heat treated aluminum alloy which is tough, wear resistant and generally of high strength. Such aluminum alloys are conventional and readily available. Following formation of the tube body 11 into a substantially perfect annulus by known techniques, its ends are joined and sealed as at 12, FIG. 1, by conventional means. The resulting structure is a true annulus with a smooth internal circumferential bore free of gaps and circular in cross section. The diameter of the annular tube body 11 and its cross sectional size will vary in accordance with the size of the wheel wheel on which the device is installed. In practice, three cross sectional sizes for the tube body 11 are thought to be adequate for the full range of automotive and aircraft wheel sizes on which the invention will be installed. These three sizes are ⅜ inch, ½ inch and ¾ inch outside diameter for the high quality aircraft aluminum alloy from which the annular tube body is constructed. In this connection, the drawings are illustrative only of one preferred embodiment and are not intended to be dimensionally accurate.

Installed permanently in the uniform bore of the annular tube body 11 are a plurality of precut equal length and equal diameter relatively short separate tube segments or sections 13, preferably formed of nylon tubing or equivalent tough plastics material. The precise number and uniform size of the tube segments 13 is calculated empirically in relation to the wheel size for which the device is used, as previously explained. However, in any case, the non-metallic tube segments 13 will occupy a large portion of the internal volume of the annular tube body 11, such as for example 75%–80% of the total internal volume.

Enough clearance is provided between the bore of tube body 11 and the o.d. of nylon tube segments 13 to promote free circulation of the tube segments within and through the bore of the tube body during wheel rotation. The remaining internal space within the tube body 11 unoccupied by the tube segments 13 is filled up with uniform size lead or steel balls 14. For automotive applications, lead balls will be used and for higher speed aircraft wheel applications steel balls will be employed to resist "splattering" under the influence of greater degrees of centrifugal force.

In a practical application where the annular tube body 11 is constructed from ⅜ inch o.d. aluminum alloy tubing having a wall thickness of 0.028 inch, which tubing size is usable with all wheel diameter sizes from 10 inch up to 16.5 inch, the following component part sizes will prevail. The nylon tubing segments 13 will be not less than ⅜ inch long and not more than ¾ inch long. Each tubing segment will have an o.d. of approximately 0.285 inch and a bore or i.d. of approximately 0.126 inch. The diameter of each circulating ball 14 will be approximately 0.095 inch which is the standard diameter of No. 7.5 lead shot. On the above basis, approximately 0.034 clearance will exist between the i.d. of the annular tube body 11 and the o.d. of the nylon tube segments 13, and approximately 0.031 inch clearance will exist between the balls 14 and the bores of the nylon tubing segments. As explained, these dimensions of component parts will change for different ranges of wheel sizes and the three basic tubing sizes employed for the annular tube body 11, namely, ⅜ inch, ½ inch and ¾ inch o.d. tubing. In all cases, however, the operating principle and the mode of operation of the invention remain unchanged.

In the above described dimensional embodiment employing ⅜ inch o.d. aluminum alloy tubing for a number of wheel sizes, approximately four ounces of lead balls 14 (shot) will be utilized in the annular tube body 11 along with approximately 35⅝ linear inches of 0.285 o.d. nylon tubing cut into equal lengths of not less than ⅜ inch to not more than ¾ inch.

The annular tube body 11 is installed preferably on the interior side of wheel rim 15 by means of a plurality of attachment clips 16 of a conventional type, so that the tube body 11 is fixed to the wheel and turns therewith. During rotation and under the influence of centrifugal force which increases with rotational speed the nylon tube segments 13 are free to circulate and to position themselves within the bore of the tube body 11 and the shot or balls 14 are likewise free to circulate through the bore of the tube body 11 and also through the bores of tube segments 13. Depending upon prevailing conditions of wheel imbalance present in a given application of the invention, the elements 13 and 14 will respond to centrifugal force and position themselves to compensate exactly for wheel imbalance and thus restore a substantially perfect dynamic balance to the wheel during all speeds of rotation thereof.

An important feature of the invention inherently present in the structure is that the balanced condition achieved during rotation of the wheel tends to be permanent or to "hold" after the wheel returns to rest. This is due to the fact that at rest the tubing sections 13 tend to hold their adjusted positions in the bore of tubing body 11, and the balls or shot 14 tend to be captured and held in the spaces or gaps between the tubing sections 13. Any slight imbalance which may develop in the wheel at rest is quickly eliminated during the next rotational acceleration of the wheel, during which the components 13 and 14 are readjusted by centrifugal forces so as to restore a nearly perfect balance to the wheel automatically.

Figure 2:
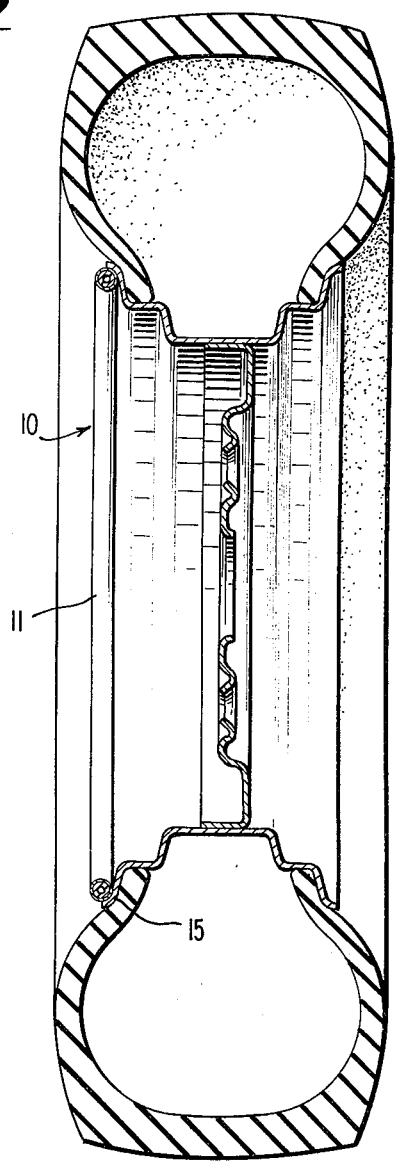
FIG. 2 is a cross sectional view of the wheel and the invention taken on line 2—2 of FIG. 1.
Figure 3:
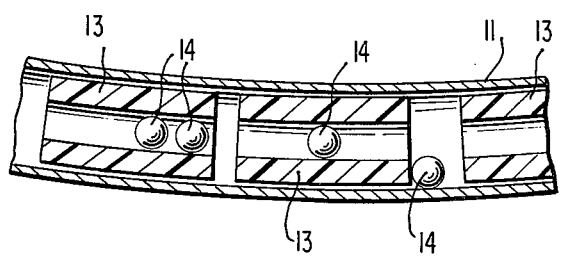
FIG. 3 is an enlarged fragmentary vertical cross section through a circumferential segment of the invention showing the annular tube body and associated internal components.
Figure 5:
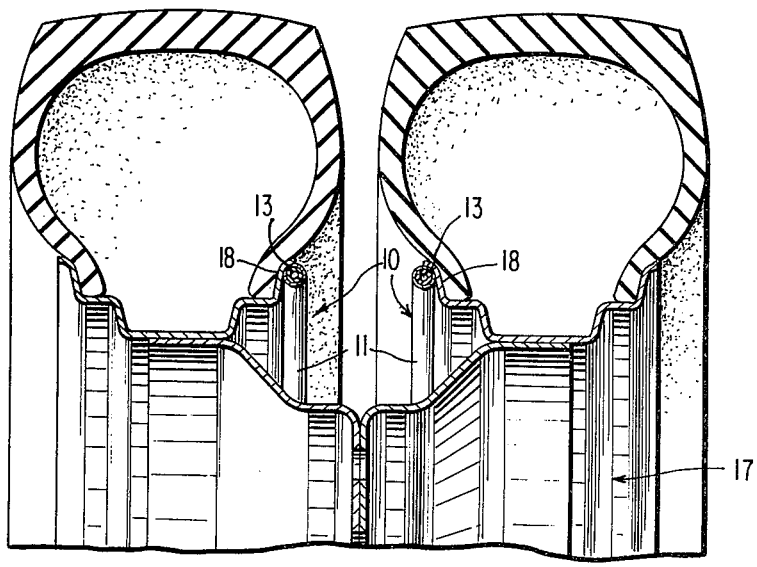
FIG. 5 is a cross sectional view similar to FIG. 2 showing the invention on a dual wheel assembly.
Figure 4:
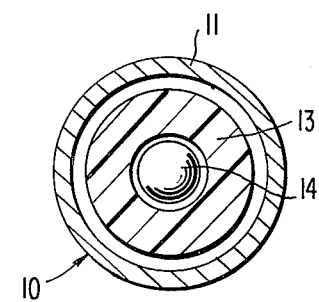
FIG. 4 is an enlarged transverse cross section taken through the invention as shown in FIG. 3.

FIG. 5 shows the application of the invention to a dual wheel assembly 17, such as a typical bus or truck wheel, as distinguished from the automobile wheel shown in FIG. 2. In FIG. 5, a pair of the invention units 10 is installed on the opposing interior wheel rim portions 18 where the invention is concealed, protected and out of the way. Each unit 10 of the invention then functions independently of the other unit to balance the two sections of the dual wheel assembly by the identical mode of operation already described in connection with FIGS. 1 to 4.

As previously stated, a dry lubricant such as raw talc or powdered graphite in nominal amount is introduced into the bore of tube body 11 to reduce friction between the relatively moving parts to the minimum. In some instances, a coating of teflon or the like may be applied to the parts for this same purpose in lieu of the described dry lubricants.

It should also be mentioned that during the operation of the invention while the wheel is in motion, the tubing sections 13 distribute themselves inside of the tube body 11 in the proper manner to cure wheel imbalance as required for a particular wheel. Simultaneously, the balls 14 will flow through the bores of tubing sections 13 and distribute themselves in the gaps or spaces between the nylon tubing sections where needed to place the wheel in near perfect balance.

There is virtually no noise and very little friction involved in the operation of the invention and consequently little wear on the component parts. Therefore, it is believed that when properly installed the wheel balancing device should last for the life of the vehicle, and not merely for the life of the tire. In the absence of serious damage due to a collision or the like, jamming of the parts inside of the tube body 11 so as to render the device inoperable is impossible as a practical matter.

A side benefit of the invention is the improvement in vehicle steering and control due to properly balanced wheels. Another side benefit is that the invention due to an inherent gyro action tends to hold the vehicle "on track" so that it will not tend to deviate from the roadway. Also, the use of the invention alleviates the necessity for tire and wheel rotation, and thus effects further economy.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wheel balancing device comprising an annular tube body adapted for attachment to one side of a wheel, a multiplicity of separately formed relatively short tube segments disposed bodily within the interior of said tube body and adapted to circulate freely circumferentially therein and collectively filling a major portion of the volume formed by the interior of the tube body, and a multiplicity of relatively small ball elements disposed within the interior of the tube body and adapted to circulate freely therein and also adapted to circulate freely through the interiors of said tube segments, whereby the tube segments and ball elements may be distributed by centrifugal force during rotation of a wheel to which the device is attached for balancing said wheel.

2. A wheel balancing device as defined by claim 1, wherein said annular tube body is formed of metal and said relatively short tube segments are non-metal low friction elements, said ball elements consisting of metal shot.

3. A wheel balancing device as defined by claim 2, and said annular tube body formed from aluminum alloy tubing, and said relatively short tube segments formed of nylon tubing.

4. A wheel balancing device as defined by claim 1, and wherein said annular tube body and relatively short tube segments are circular in cross section, said tube segments being of equal lengths and equal diameters and being somewhat smaller in outside diameter than the bore of said tube body, the bores of the tube segments being somewhat smaller than the diameters of said ball elements.

5. A wheel balancing device as defined by claim 4, and wherein each tube segment is less than one inch in length and has square cut ends, the opposing ends of adjacent tube segments forming entrapment chambers for said ball elements in the interior of the annular tube body, whereby the balancing of the wheel by said device is a substantially permanent balancing which will be maintained when the wheel returns to rest.

6. A wheel balancing device as defined by claim 1, wherein a pair of said annular tube bodies each containing said short tube segments and said ball elements are attachable separately to the sides of rims in a dual wheel assembly, whereby each wheel of the assembly may be independently balanced during rotation.

7. A wheel balancing device as defined by claim 1, and clip means for attaching said annular tube body to a wheel rim.

8. A wheel balancing device as defined by claim 1, and wherein said tube segments fill approximately 70–80% of the interior space in the tube body, said ball elements adapted to fill approximately the remainder of the interior space in the tube body.

* * * * *